US 7,342,342 B2

(12) United States Patent
Naitou et al.

(10) Patent No.: US 7,342,342 B2
(45) Date of Patent: Mar. 11, 2008

(54) ROTARY ELECTRICAL MACHINE AND ELECTRIC VEHICLE HAVING THE SAME

(75) Inventors: Shinya Naitou, Shizuoka-ken (JP); Haruyoshi Hino, Shizuoka-ken (JP); Keiko Murota, Shizuoka-ken (JP); Hiroyuki Ishihara, Shizuoka-ken (JP); Junji Terada, Shizuoka-ken (JP); Tomohiro Ono, Shizuoka-ken (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 11/335,868

(22) Filed: Jan. 18, 2006

(65) Prior Publication Data

US 2006/0181172 A1    Aug. 17, 2006

Related U.S. Application Data

(63) Continuation of application No. PCT/JP2004/007603, filed on Jun. 2, 2004.

(30) Foreign Application Priority Data

Jul. 18, 2003  (JP) ............................. 2003-199078

(51) Int. Cl.
*H02K 1/06* (2006.01)
(52) U.S. Cl. ...................... 310/209; 310/261
(58) Field of Classification Search ............ 310/261, 310/67 R, 67 A, 268, 83, 209
See application file for complete search history.

(56) References Cited

U.S. PATENT DOCUMENTS

| 2,453,523 | A | * | 11/1948 | McCullough | ............. | 310/75 D |
|---|---|---|---|---|---|---|
| 3,566,165 | A | | 2/1971 | Lohr | | |
| 4,132,281 | A | | 1/1979 | Gaddi | | |
| 4,536,668 | A | | 8/1985 | Boyer | | |
| 4,829,208 | A | | 5/1989 | Uchino | | |
| 4,877,987 | A | * | 10/1989 | Flaig et al. | .................. | 310/209 |
| 5,014,800 | A | | 5/1991 | Kawamoto et al. | | |
| 5,036,213 | A | | 7/1991 | Isozumi | | |
| 5,087,229 | A | | 2/1992 | Hewko et al. | | |
| 5,144,183 | A | | 9/1992 | Farrenkopf | | |
| 5,272,938 | A | | 12/1993 | Hsu et al. | | |
| 5,294,853 | A | | 3/1994 | Schluter et al. | | |
| 5,304,878 | A | | 4/1994 | Oda et al. | | |
| 5,442,250 | A | | 8/1995 | Stridsberg | | |
| 5,505,277 | A | | 4/1996 | Suganuma et al. | | |

(Continued)

FOREIGN PATENT DOCUMENTS

DE              411 877 C        4/1925

(Continued)

OTHER PUBLICATIONS

Translation for JP 2002-325412.*

(Continued)

*Primary Examiner*—Dang Le
*Assistant Examiner*—Nguyen Hanh
(74) *Attorney, Agent, or Firm*—Knobbe Martens Olson & Bear LLP

(57) ABSTRACT

A rotary electrical machine includes a rotational shaft supported by a housing for rotation about an axis, a rotor coupled with the rotational shaft, and a stator fixed to the housing and oriented to face the rotor. A rotor position changing mechanism moves the rotor in an axial direction of the rotational shaft using a portion of a torque transmitted between the rotational shaft and the rotor as a driving force. The rotor position changing mechanism controls the strength of the magnetic field between the rotor and the stator by moving the rotor toward or away from the stator.

26 Claims, 7 Drawing Sheets

U.S. PATENT DOCUMENTS

| | | |
|---|---|---|
| 5,570,752 A | 11/1996 | Takata |
| 5,581,136 A | 12/1996 | Li |
| 5,691,584 A | 11/1997 | Toida et al. |
| 5,755,304 A | 5/1998 | Trigg et al. |
| 5,818,134 A | 10/1998 | Yang et al. |
| 5,826,675 A | 10/1998 | Yamamoto |
| 5,834,874 A | 11/1998 | Krueger et al. |
| 5,915,493 A | 6/1999 | Nakayama |
| 5,960,901 A | 10/1999 | Hanagan |
| 6,046,518 A | 4/2000 | Williams |
| 6,121,711 A | 9/2000 | Nakahara et al. |
| 6,199,652 B1 | 3/2001 | Mastroianni et al. |
| 6,321,863 B1 | 11/2001 | Vanjani |
| 6,590,306 B2 | 7/2003 | Terada |
| 6,765,327 B2 | 7/2004 | Hashimoto et al. |
| 2001/0010439 A1 | 8/2001 | Klinger et al. |
| 2003/0221887 A1 | 12/2003 | Hsu |

FOREIGN PATENT DOCUMENTS

| | | |
|---|---|---|
| EP | 0 980 821 A2 | 2/2000 |
| EP | 1 220 427 A2 | 7/2002 |
| EP | 1 270 395 A3 | 3/2005 |
| FR | 1 534 007 A | 7/1968 |
| JP | 43-10683 | 5/1968 |
| JP | 02-37027 | 5/1989 |
| JP | 03-215154 | 9/1991 |
| JP | 04-185207 A | 7/1992 |
| JP | 5-300712 | 11/1993 |
| JP | 11-034965 | 2/1999 |
| JP | 11-122886 | 4/1999 |
| JP | 2000-261988 | 9/2000 |
| JP | 2001-298901 | 10/2001 |
| JP | 2002-247822 * | 8/2002 |
| JP | 2002-325412 | 11/2002 |
| JP | 2003-191883 | 7/2003 |
| JP | 2004-166369 A | 6/2004 |

OTHER PUBLICATIONS

Co-Pending U.S. Appl. No. 11/298,979, filed Dec. 9, 2005 in the name of Haruyoshi Hino et al.

Search Report in related PCT Application No. PCT/JP2004/007603, mailed Aug. 24, 2004.

Search Report for European Patent Application No. EP 05 02 6632, mailed Mar. 31, 2006 (2 pages).

* cited by examiner

ROTARY ELECTRICAL MACHINE AND ELECTRIC VEHICLE HAVING THE SAME

CROSS-REFERENCE TO RELATED APPLICATIONS

This application is a continuation of PCT Application No. PCT/JP2004/007603, which was filed on Jun. 02, 2004 and published in Japanese on Jan. 27, 2005 as WO 05/008865 A1, the entire contents of which are incorporated herein by reference and should be considered a part of this specification. The above PCT application claims priority to Japanese Patent Application No. 2003-199078, filed on Jul. 18, 2003.

BACKGROUND OF THE INVENTION

1. Field of the Invention

The present invention relates to a rotary electrical machine and an electric vehicle having the same.

2. Description of the Related Art

Conventional, rotary electrical machines have a rotor, a rotational shaft attached to the rotor, and a stator. The strength of the magnetic field between the rotor and the stator is controlled in response to a rotational speed of the rotor. In this kind of rotary electrical machine, the characteristic of the rotary electrical machine (such as, for example the relationship between the rotational speed and the output torque of the rotational shaft) can be adjusted by controlling the strength of the magnetic field.

One such rotary electrical machine is disclosed, for example, in Japanese Publication No. JP 11-122886. This rotary electrical machine includes a housing, which is a stationary side member and forms an outer shell of the rotary electrical machine, and a rotational shaft journaled on the housing for rotation about an axis thereof, but not for movement in the axial direction thereof. The rotary electrical machine also includes a rotor coupled with the rotational shaft to rotate therewith about the axis, a stator supported by the housing so as to face the rotor, and a centrifugal governor joined to a distal end of the rotational shaft. A yoke, which forms the stator, has multiple receiving apertures that extend parallel to the axial direction of the rotational shaft (and can be simply described as "extending in the axial direction" below). Auxiliary yokes, each of which extends in the axial direction of the rotational shaft are inserted into corresponding receiving apertures. Each auxiliary yoke is connected to the centrifugal governor. The centrifugal governor moves the associated auxiliary yoke in the axial direction. That is, an inserted length of each auxiliary yoke is variable in accordance with the rotational speed of the rotational shaft. Thus, the movement of the yoke varies in response to the rotational speed of the rotational shaft, and the strength of the magnetic field established between the rotor and the stator can be adjusted.

When the rotary electrical machine operates as an electric motor, an electric current is supplied to the stator so that the rotor rotates. With the rotation of the rotor, the rotational shaft generates output torque. In the rotary electrical machine described above, if the rotational shaft rotates at high speed, the magnetic field is weakened because of an action of the centrifugal governor. As a result, the output torque per unit current (i.e., output torque of the rotational shaft generated per unit current flowing through the stator) decreases. As thus discussed, by weakening the magnetic field, the rotational shaft can rotate at a high speed under a low torque condition.

Conversely, when the rotational shaft rotates at a low speed, the magnetic field can be strengthened by the centrifugal governor operating in association with the rotational shaft. As a result, the output torque per unit current increases. Thus, by strengthening the magnetic field, the rotational shaft can rotate at a low speed under a high torque condition. That is, in the rotary electrical machine described above, when it operates as an electric motor, a torque characteristic can be obtained in which the rotational speed increases while the output torque of the rotational shaft is small, and also the output torque increases while the rotational speed is low.

Japanese Publication No. JP 03-215154 discloses a rotary electrical machine in which the strength of the magnetic field between a rotor and a stator is adjusted by urging the rotor toward or away from the stator. This rotary electrical machine includes a stationary side member and a rotational shaft journaled on the stationary side member for rotation about an axis thereof. The rotor is coupled to the rotational shaft to rotate about the axis and the stator is supported by the stationary side member so as to face the rotor. A spring urges the rotational shaft in a direction in which the rotor recedes from the stator, and an electromagnet is electrically connected to the stator in series. The rotational shaft is formed of a magnetic material. In this rotary electrical machine, when an electric current is supplied to the electromagnet, the electromagnet attracts the rotational shaft in the axial direction. If the attractive force of the electromagnet is larger than the urging force of the spring, the rotor approaches the stator. Conversely, if the attractive force of the electromagnet is smaller than the urging force of the spring, the rotor recedes from the stator. As thus discussed, the electromagnet and the spring together form an actuator that moves the rotational shaft in the axial direction.

When the rotary electrical machine described above operates as an electric motor, an electric current is supplied to the stator and the electromagnet to rotate the rotor. If the load applied to the rotational shaft is small, the current supplied to the stator is small. Thus, the current supplied to the electromagnet is also small, and the electromagnetic force of the electromagnet is small. Accordingly, the force of the electromagnet that attracts the rotational shaft is smaller than the urging force of the spring, and the rotor is kept separate from the stator. Consequently, the gap size between the rotor and the stator is large to maintain the magnetic field therebetween weak.

On the other hand, as the load applied to the rotational shaft increases, the current supplied to the stator increases. Thus, the current supplied to the electromagnet also increases, and the attractive force of the electromagnet becomes larger than the urging force of the spring. Because of the attractive force of the electromagnet, the rotational shaft moves in the direction in which the rotor approaches the stator. Consequently, the gap size between the rotor and the stator decreases to strengthen the magnetic field therebetween.

Thus, according to the rotary electrical machine disclosed in Japanese Publication No. JP 03-215154, the same torque characteristic as that of the rotary electrical machine disclosed in Japanese Publication No. JP 11-122886 can be obtained. That is, when the rotary electrical machine disclosed in JP 03-215154 operates as an electric motor, a torque characteristic can be obtained in which the rotational speed is high while the output torque of the rotational shaft is small, as well as one in which the output torque is large while the rotational speed is low.

The rotary electrical machine disclosed in Japanese Publication No. JP 11-122886 needs a centrifugal governor attached to the rotational shaft to obtain the torque characteristic discussed above. However, because the centrifugal governor generates the centrifugal force using a weight, the governor needs some structure that moves the weight in a radial direction of the rotor. In order to ensure a space for the movement of the weight, the rotary electrical machine needs to have a certain capacity in the radial direction. Accordingly, a problem arises in that the external size of the rotary electrical machine is inevitably large. Also, because the receiving apertures, the auxiliary yokes and the like described above are necessary in addition to the centrifugal governor, another problem arises in that the structure of the rotary electrical machine is complicated.

The rotary electrical machine disclosed in Japanese Publication No. JP 03-215154 needs to have the above-described actuator provided outside of the rotational shaft in the axial direction. The length of the rotary electrical machine in the axial direction can be longer correspondingly to the length of the actuator. Thus, the size of the rotary electrical machine is inevitably large. A large space thus is needed for mounting the rotary electrical machine.

SUMMARY OF THE INVENTION

In view of the circumstances, an aspect of the present invention is to decrease external dimensions of a rotary electrical machine, and also to simplify the structure of the machine, in which a rotor is moved in an axial direction to urge the rotor toward or away from a stator. The movement of the rotor toward or away from the stator strengthens or weakens, respectively, the magnetic field between the rotor and the stator. Therefore, the strength of the magnetic field between the rotor and the stator is controllable.

Also, another aspect of the present invention is to make the rotor of the rotary electrical machine movable in the axial direction without increasing external dimensions of the machine or making the structure of the machine more complicated.

In accordance with one aspect of the present invention, a rotary electrical machine comprises a base member, a stator fixed to the base member, a rotational shaft supported by the base member for rotation about an axis, and a rotor coupled with the rotational shaft and disposed so as to face the stator. The rotary electrical machine also comprises a rotor position changing mechanism that is configured to transmit a torque between the rotor and the rotational shaft. The rotor position changing mechanism is also configured to urge the rotor toward the stator along an axial direction of the rotational shaft, as torque transmitted from the rotor to the rotational shaft increases.

The rotary electrical machine can be constructed, for example, so that when the rotary electrical machine operates as an electric motor, the torque is transmitted to the rotational shaft from the rotor to drive the rotational shaft. On the other hand, when the rotary electrical machine operates as a generator, the torque is transmitted to the rotor from the rotational shaft to drive the rotor. Additionally, the rotary electrical machine is not limited to such a machine operating as either the electric motor or the generator. For example, a rotary electrical machine that operates only as the electric motor or only as the generator is contemplated.

The rotary electrical machine can be constructed, for example, so that the strength of the rotary electrical machine is controlled in response to the magnitude of the torque transmitted between the rotational shaft and the rotor. In accordance with the magnetic field controlled in such a manner, the relationship between the rotational speed and the torque of the rotational shaft, i.e., the torque characteristic, varies. As a result, by properly controlling the magnetic field, the torque characteristic of the rotary electrical machine can be desirably changed. For example, a torque characteristic can be realized in which, when the rotary electrical machine operates as the electric motor, the output torque is large while the rotational speed is in a low speed range, as well as one in which the output torque is small while the rotational speed is in a high speed range. Thus, for example, the rotary electrical machine can operate in a wide operational range.

The rotor position changing mechanism can be constructed to preferably includes a force component generating mechanism for generating a force component from the transmission torque transmitted between the rotational shaft and the rotor to move the rotor in the axial direction of the rotational shaft.

A force component can therefore be generated from the transmission torque, and the rotor can move in the axial direction of the rotational shaft in response to the force component. Accordingly, the magnetic field can be controlled by the force component of the transmission torque.

In accordance with another aspect of the present invention, a rotary electrical machine comprises a base member, a stator fixed to the base member, a rotational shaft supported by the base member for rotation about an axis, and a rotor coupled to the rotational shaft and disposed so as to face the stator. The rotary electrical machine also comprises a rotor position changing mechanism that is configured to transmit a torque between the rotor and the rotational shaft. The rotor position changing mechanism is also configured to urge the rotor away from the stator along an axial direction of the rotational shaft, as torque transmitted from the rotor to the rotational shaft decreases, when the rotary electrical machine operates as an electric motor.

In one mode, when the rotary electrical machine operates as an electric motor, if the torque transmitted from the rotor to the rotational shaft increases, the rotor approaches the stator, and the magnetic field between the rotor and the stator strengthens. Thus, when the load applied to the rotational shaft is large, the output torque of the rotational shaft can be large. Therefore, for example, if the rotary electrical machine is used as a driving force source for operating an electric vehicle, the output torque of the electric vehicle in a starting operation or in an accelerating operation can be large. Quick start or acceleration of the electric vehicle can thus be realized.

In another mode, when the rotary electrical machine operates as the electric motor, if the torque transmitted from the rotor to the rotational shaft decreases, then the rotor moves away from the stator, and the magnetic field between the rotor and the stator weakens. Thus, when the load applied to the rotational shaft is small, the rotational shaft can rotate at a high speed. Thereby, for example, if such a rotary electrical machine is applied to the electric vehicle, the running speed of the vehicle when the output torque is small (e.g., under a low torque condition) can be high.

In accordance with another aspect of the present invention, a rotary electrical machine comprises a base member, a stator fixed to the base member, a rotational shaft supported by the base member for rotation about an axis, and a rotor coupled with the rotational shaft and disposed so as to face the stator. The rotary electrical machine also comprises a rotor position changing mechanism that is configured to transmit a torque between the rotor and the rotational shaft and to urge the rotor away from the stator along an axial direction of the rotational shaft as torque transmitted from the rotational shaft to the rotor increases.

Therefore, in one mode, when the rotary electrical machine operates as the generator, if the torque transmitted to the rotor from the rotational shaft increases, the rotor moves away from the stator, and the magnetic field between the rotor and the stator weakens. Thus, an overcharge by the rotary electrical machine can be inhibited. Also, when the rotary electrical machine functions to provide regenerative braking, an over-braking situation can be inhibited.

Further, in one mode, when the rotor has moved to a desired position, if the force by which the rotor position changing mechanism forces the rotor to recede from the stator and the attractive magnetic force generated between the rotor and the stator balance with each other, the rotor can be placed at a desired position regardless of the rotational speed of the rotational shaft. That is, the voltage generated by the rotary electrical machine can be nearly fixed. Thus, by adjusting the force that makes the rotor recede from the stator, the generating characteristic of the rotary electrical machine (or the braking characteristic thereof when the rotary electric machine is used for regenerative braking) can be freely set. If the generated voltage is charged into a secondary battery, generating circuits such as, for example, a voltage rising circuit or a voltage lowering circuit can be simplified. Also, the characteristic of the rotary electrical machine can be adjusted so as to be suitable for charging.

In accordance with another aspect of the invention, an electric vehicle can comprise the rotary electrical machine described above as a driving force.

As thus described, according to the present rotary electrical machine, the compact and simple structure can make the rotor approach or recede from the stator. Thus, the strength of the magnetic field between the rotor and the stator can be controlled. In addition, the rotor can be moved in the axial direction of the rotational shaft without requiring an increase in the external dimensions of the machine or complicating the structure of the machine.

BRIEF DESCRIPTION OF DRAWINGS

The above and other features, aspects and advantages of the present invention will now be described with reference to drawings that show presently preferred embodiments, which are intended to illustrate and not to limit the present invention. The drawings contain the following 7 figures.

DETAILED DESCRIPTION OF THE EMBODIMENTS

Embodiments of the present invention will be described using figures below. The following respective embodiments are those in which a rotary electrical machine according to the present invention applies to an electric vehicle. However, the application of the rotary electrical machine is not limited the electric vehicle.

Figure 1:
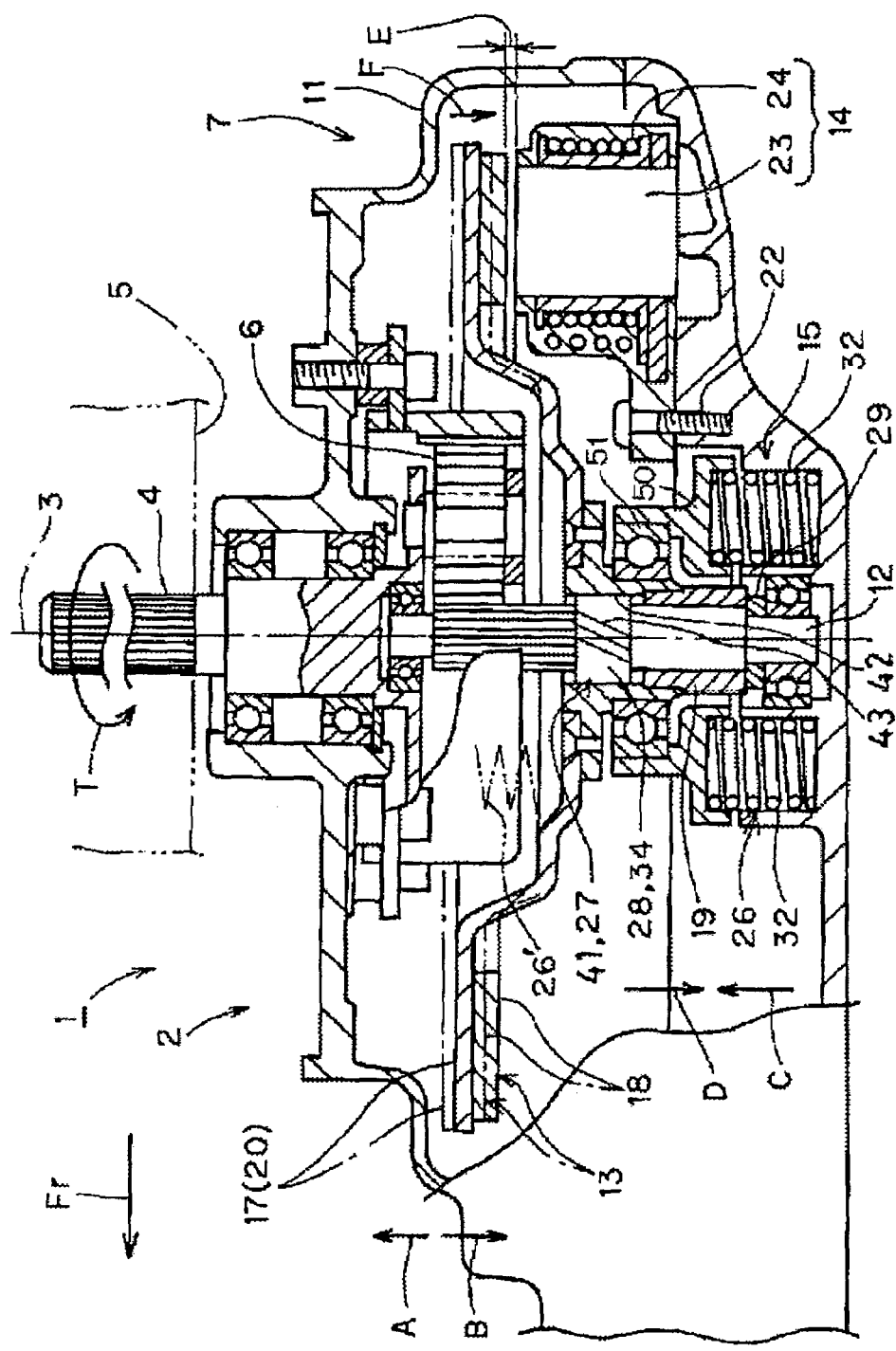
FIG. 1 is a cross sectional plan view of a rotary electrical machine according to a first embodiment.
Figure 2:
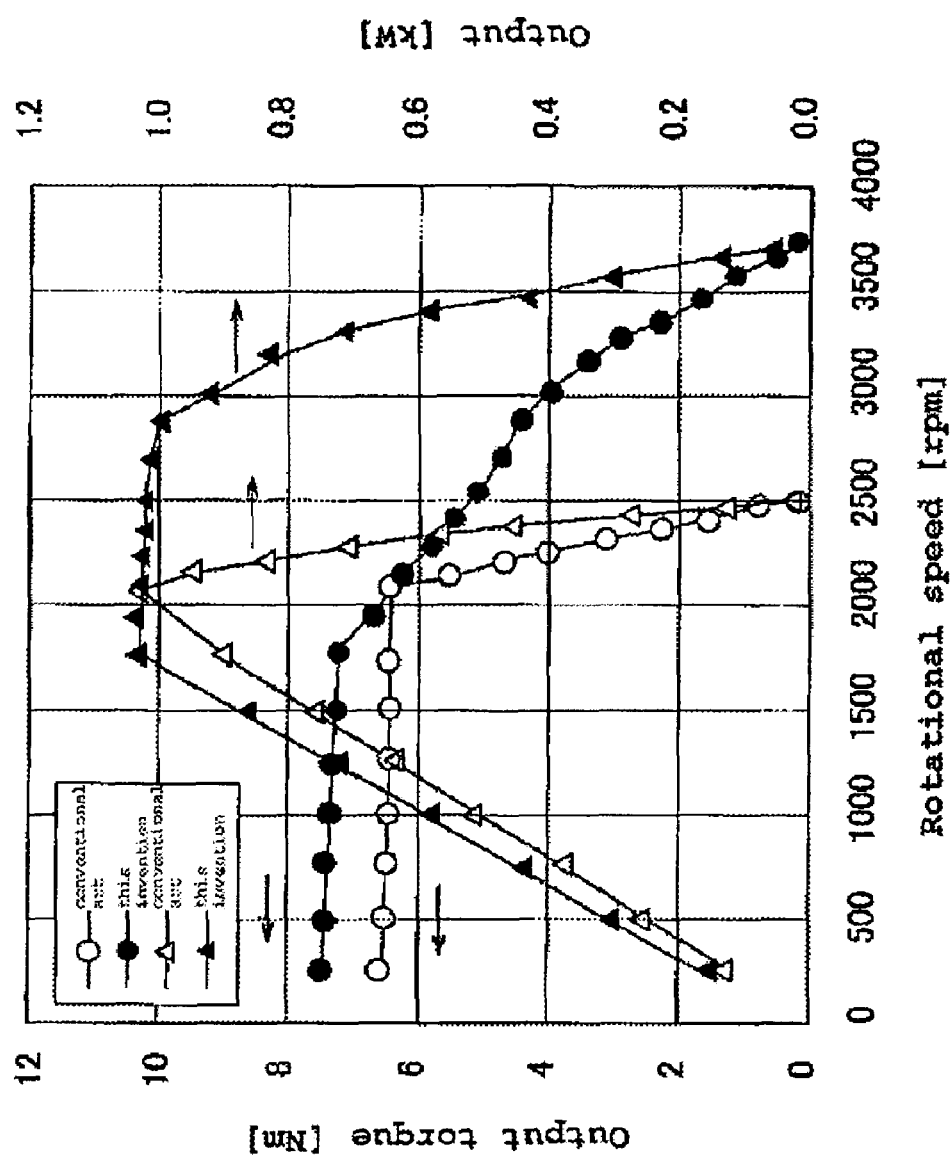
FIG. 2 is a graph, comparatively showing a torque characteristic of the first embodiment and a conventional torque characteristic.

With reference to FIGS. 1 and 2, a first embodiment will be described. In FIG. 1, the reference numeral 1 indicates the electric vehicle. The electric vehicle 1 of this embodiment is a motorcycle which is a kind of straddle type vehicle. However, the electric vehicle according to the present invention is not limited to the straddle type vehicle. The arrow Fr indicates the forward direction of the electric vehicle 1 (e.g., toward the front end of the vehicle 1).

The electric vehicle 1 includes a vehicle body, which is not shown, and a rear arm 2 supported by the vehicle body for up and down swing movement of the arm 2 relative to the vehicle body. The rear arm 2 has an axle 4 at a swing end in a rear portion of the rear arm 2, the axle 4 extending in a width direction of the vehicle body (e.g., up to down direction of FIG. 1) and being supported for rotation about an axis 3. A drive wheel 5 which in the illustrated embodiment, is a rear wheel, is coupled with the axle 4. The electric vehicle 1 additionally has a rotary electrical machine 7 as a driving force source for driving the vehicle 1 and which operates at least as an electric motor. The rotary electrical machine 7 is coupled with the drive wheel 5 through the axle 4 and a planetary geared speed reduction mechanism 6. The rotary electrical machine 7 is preferably disposed about the axis 3. In another embodiment, the rotary electrical machine 7 can be spaced apart from the axis 3 and still be coupled with the drive wheel 5.

The rotary electrical machine 7 has a housing 11 as a base member, a rotational shaft 12 disposed in the interior of the housing 11, a rotor 13, and a stator 14. In this electric vehicle 1, a rear end portion of the rear arm 2 forms the housing 11. Additionally, because the housing 11 can be considered to be fixed relative to the rotation of the rotational shaft 12, the housing 11 can be called a "stationary side member." The rotational shaft 12 is journaled on the housing 11 for rotation about the axis 3 thereof and not for movement in the axial direction thereof. As used herein, the terms "axial direction of the rotational shaft" means not only the direction that is consistent with the axis of the rotational shaft but also a direction parallel to the axis of the rotational shaft.

The rotor 13 is coaxially coupled with the rotational shaft 12 and rotates about the axis 3 together with the rotational shaft 12. The stator 14 is fixed to the housing 11 and faces the rotor 13. The rotor 13 and the stator 14 face each other in the axial direction of the rotational shaft 12 (e.g., the up to down direction in FIG. 1).

A rotor position changing mechanism 15 is additionally disposed in the interior of the housing 11. The rotor position changing mechanism 15 moves the rotor 13 in the direction of the rotational shaft 13 using a portion of the torque (transmission torque) T transmitted between the rotational shaft 12 and the rotor 13 as a driving force to change the position of the rotor 13 relative to the stator 14. Additionally, in the following description, a direction in which the rotor 13 recedes from the stator 14 is called "going direction A" (see FIG. 1) and an opposite direction in which the rotor 13 approaches the stator 14 is called "returning direction B." Although details will be described later, this rotor position changing mechanism 15 not only makes the rotor 13 approach the stator 14 or recede from the stator 14 but also changes the position of the rotor 13 relative to the stator 14 in response to the magnitude of the transmission torque T.

The entire configuration of the rotor 13 is generally disk-shaped. Specifically, the rotor 13 has a yoke 17 into which the rotational shaft 12 is fitted. Permanent magnets 18 are affixed to the yoke 17. The yoke 17 includes a cylindrical boss 19 having an aperture through which the rotational shaft 12 extends and a generally disk-shaped yoke body 20 supported by the boss 19. The yoke body 20 is preferably made of a magnetic material. Each permanent magnet 18 is supported by an outer circumference of one surface of the yoke body 20 (e.g., the lower surface in FIG. 1).

The stator 14 includes teeth 23 fixed to the housing 11 with a fastener and coils 24 wound around the respective teeth 23. The teeth 23 face the permanent magnets 18 of the rotor 13 in the axial direction of the rotational shaft 12.

When an electric current flows through the coils 24 of the stator 14, an attractive magnetic force F is generated between the permanent magnets 18 and the stator 14 so that both of them attract each other. As a result, the rotor 13 is provided with an external force which urges the rotor 13 in a direction in which the rotor 13 approaches the stator 14. That is, the external force goes to the returning direction B. Additionally, when the rotor 13 moves in the going direction A or in the returning direction B, the weight of the rotor 13 actually affects the movement of the rotor 13 to some extent. However, the influence of the weight of the rotor 13 is not considered in the following description.

The rotor position changing mechanism 15 includes a spring 26 urging the rotor 13 in a direction in which the rotor 13 recedes from the stator 14, and a force component generating mechanism 27 generating a force component from the transmission torque between the rotor 13 and the rotational shaft 12 that moves the rotor 13 in the axial direction of the rotor 13. One end of the spring 26 is attached to the housing 11, while the other end of the spring 26 is connected to a block 50. The block 50 is coupled with the boss 19 of the rotor 13 through bearings 51 and so forth. Accordingly, the block 50 journals the rotor 13 for rotation about the axis 3, and moves together with the rotor 13 in the axial direction of the rotational shaft 12. The urging force of the spring 26 affects the rotor 13 through the block 50. A first stopper 28 and a second stopper 29 are disposed on respective ends of the boss 19 of the rotor 13 in the axial direction. The first stopper 28 prevents the rotor 13 from receding from the stator 12 more than a preset distance, while the second stopper 29 prevents the rotor 13 from approaching the stator 12 less than another preset distance.

The spring 26 is preferably set in such a manner that the urging force of the spring 26 is greater than the attractive magnetic force F between the rotor 13 and the stator 14. Accordingly, when the transmission torque T is not more than a preset value (including T=0), the urging force of the spring 26 is greater than the attractive magnetic force F, and the rotor 13 is placed at a position spaced apart from the stator 14 (see the dotted line of FIG. 1, called "initial position" below). The spring 26 has a characteristic with which a load and a displacement amount are not in proportion to each other within a movable range of the rotor 13, e.g., non-linear characteristic. In this embodiment, the spring 26 includes multiple spring members 32 with free lengths that differ from each other. However, the spring 26 is not limited to a specific type, shape, structure, material, characteristic, etc. For example, the spring 26 can be formed with multiple spring members with characteristics that differ from each other.

As described above, the force component generating mechanism 27 is the mechanism that generates the force component from the transmission torque T between the rotor 13 and the rotational shaft 12 to move the rotor 13 in the axial direction. Also, the force component generating mechanism 27 has a so-called helical structure to move the rotational shaft 12 and the rotor 13 about the axis 3 relative to each other along a generally helical path, using the force component of the transmission torque T. That is, the force component generating mechanism 27 has a mechanical structure with a generally helical shape, which can make the rotational shaft 12 and the rotor 13 move about the axis 3 relative to each other. The movement, however, need not be perfectly helical (e.g., at a constant angle relative to the axis).

In this embodiment, the force component generating mechanism 27 is constructed with a helical gear unit 34 whose center is the axis 3. A helical gear of the helical gear unit 34 is positioned between the boss 19 of the yoke 17 and the rotational shaft 12 fitted into the boss 19. Specifically, an inner section of the force component generating mechanism 27 is formed on an outer surface of the rotational shaft 12, while an outer section of the force component generating mechanism 27 is formed on an inner surface of the boss 19, and the outer and inner sections engage with each other via the helical gear unit 34 (e.g., the rotational shaft 12 and boss 19 engage with each other via the gear unit 34). By the engagement of the rotational shaft 12 and the boss 19 with each other as discussed above, the force component is generated from the transmission torque T between the rotational shaft 12 and the boss 19. The force component moves the rotational shaft 12 and the boss 19 relative to each other generally along a helical path (see e.g., FIGS. 5-7). Additionally, the outer section and the first stopper 28 are unitarily formed with each other.

In this embodiment, when the electric vehicle 1 runs in the forward direction, the rotational shaft 12 rotates clockwise (see the arrow of the transmission torque T in FIG. 1). Thus, in order to generate a force component in a predetermined direction from the transmission torque T, a helical gear unit having a right handed screw configuration is used as the helical gear unit 34. That is, in this embodiment, when the transmission torque T is transmitted from the rotor 13 toward the rotational shaft 12, the helical gear unit 34 generates the force component D headed for a direction in which the rotor 13 approaches the stator 14 (called "right force component" below).

When the helical gear unit 34 rotates while the outer and inner sections thereof engage with each other, the rotor 13 moves in the axial direction. The direction of the movement rotor 13 (e.g., going direction A or returning direction B) is decided in accordance with the urging force C of the spring 26 acting in the going direction A, the attractive magnetic force F acting between the rotor 13 and the stator 14 in the returning direction B, and the right force component D acting in the returning direction B.

When the rotor 13 moves in the going direction A with the slide movement of the outer and inner sections, the respective permanent magnets 18 of the rotor 13 recede from the teeth 23 of the stator 14 along the axial direction of the rotational shaft 12. Also, a gap size E of a gap (space) separating each permanent magnet 18 of the rotor 13 and the respective tooth 23 of the stator 14 from one another increases. When the rotor 13 further moves toward the going direction A, the boss 19 of the yoke 17 of the rotor 13 abuts on the first stopper 28 so as to prevent the further movement of the rotor 13 (see the dotted line in FIG. 1).

On the other hand, when the rotor 13 moves in the returning direction B with the slide movement of the outer and inner sections, the respective permanent magnets 18 of the rotor 13 approach the teeth 23 of the stator 14 along the axial direction of the rotational shaft 12. Also, the gap size E described above decreases. When the rotor 13 further moves toward the returning direction B, the boss 19 of the yoke 17 of the rotor 13 abuts on the second stopper 29 so as to prevent the further movement of the rotor 13 (see the actual lines in FIG. 1). In this state, the gap size E equals the minimum value in the predetermined range.

Next, an operation of the rotary electrical machine 7 will be described. First, an operation in which the rotary electrical machine 7 works as an electric motor will be described.

When the rotary electrical machine 7 works as the electric motor, the rotor 13 rotates, and the rotational shaft 12 also rotates because the torque is transmitted from the rotor 13 to the rotational shaft 12. Also, the torque (output torque) of the rotational shaft 12 is transmitted to the drive wheel 5 through the speed reduction mechanism 6 and the axle 4 to drive the drive wheel 5. Consequently, the electric vehicle 1 runs.

In this state, if the torque between the rotational shaft 12 and the drive wheel 5 (e.g., the load of the rotational shaft 12) is small, the transmission torque T transmitted from the rotor 13 to the rotational shaft 12 is small. The right force component D generated by the force component generating mechanism 27 is also small. Thus, the urging force C of the spring 26 is larger than the resultant force made up of the right force component D and the attractive magnetic force F, and the rotor 13, as the entire body thereof, receives the external force headed in the going direction A. As a result, the rotor 13 moves to the going direction A so as to recede from the stator 14. Accordingly, the gap size E becomes larger (see the one dot chain lines of FIG. 1). The magnetic field established between the rotor 13 and the stator 14 thus becomes weaker. Consequently, the rotational shaft 12 can rotate at a high speed under a condition that the output torque (specifically, the output torque per unit current flowing through the stator 14) is low, e.g., under a low torque condition.

On the other hand, if the load given to the rotational shaft 12 increases, the transmission torque T transmitted to the rotational shaft 12 from the rotor 13 increases. The right force component D generated by the force component generating mechanism 27 also increases. Thus, the resultant force made up of the right force component D and the attractive magnetic force F becomes larger than the urging force C of the spring 26, and the rotor 13, as the entire body thereof, receives the external force headed in the returning direction B. As a result, the rotor 13 moves to the returning direction B so as to approach the stator 14. Accordingly, the gap size E becomes smaller (see the actual lines in FIG. 1). The magnetic field thus becomes stronger and the output torque of the rotational shaft 12 increases.

Thus, according to the rotary electrical machine 7, the output torque of the rotational shaft 12 can be adjusted in response to the load of the rotational shaft 12. That is, when the rotary electrical machine 7 operates as the electric motor, a torque characteristic can be obtained in which the rotational shaft 12 can rotate at a high speed under the condition that the output torque of the rotational shaft 12 is a low torque condition, and one in which the output torque of the rotational shaft 12 can be a high torque under the condition that the rotational shaft 12 rotates at a low speed.

FIG. 2 shows an experimental result obtained when the rotary electrical machine 7 having the structure described above operates as the electric motor. From the experimental result, it can be understood that, according to the rotary electrical machine 7, the output torque at every speed is larger than that of a conventional rotary electrical machine in which the magnetic field is not changed. Additionally, the output power of the rotary electrical machine 7 is a maximum while the rotational speed exists between 1,800-2,800 rpm.

Next, an operation of the rotary electrical machine 7 when it works as a generator will be described.

For example, when the electric vehicle 1 moves forward on a downhill road, transmission torque (input torque) is inputted to the rotational shaft 12 from the axle 4. The rotary electrical machine 7 makes a regenerative braking function as a generator to brake the electric vehicle 1. On this occasion, the force component generating mechanism 27 generates a force component (headed for the reverse direction relative to the right force component D, called "reverse force component" below), from the transmission torque T transmitted from the rotational shaft 12 to the rotor 13. This reverse force component is an external force acting on the rotor 13 in the going direction A similar to the urging force C of the spring 26. When the resultant force made up of the reverse force component and the urging force C becomes larger than the attractive magnetic force F, the rotor 13, as the entire body thereof, receives the external force headed in the going direction A, and the rotor 13 recedes from the stator 14. The magnetic field is thus weakened, and the load of the rotational shaft 12 decreases. Accordingly, any rapid braking of the electric vehicle 1 due to the regenerating braking function of the rotary electrical machine 7 is avoided to keep smooth running.

As thus described, because the rotary electrical machine 7 has the rotor position changing mechanism 15 that makes the rotor 13 approach the stator 14 or recede from the stator 14, the torque characteristic can be adjusted by adjusting the gap size E between the rotor 13 and the stator 14. Thus, according to this rotary electrical machine 7, desired characteristics can be obtained in connection with the relationships between the rotational speed and the output torque or between the rotational speed and the input torque.

The rotor position changing mechanism 15 uses the portion of the transmission torque T as the driving force to move the rotor 13. That is, the rotary electrical machine 7 controls the magnetic field based upon the transmission torque T directly relating to the output torque or the input torque on the rotational shaft 12. Accordingly, the rotary electrical machine 7 does not need any centrifugal governor, although the conventional art controls the magnetic field using such a centrifugal governor which external size is large and whose structure is complicated. The external size of the rotary electrical machine 7 thus can be compact, and the structure thereof can be simpler. Therefore, the size of the electric vehicle 1 or the like can be reduced or the vehicle 1 can be made simpler by applying the rotary electrical machine 7 to the electric vehicle 1 or the like.

Also, according to the rotary electrical machine 7, because the magnetic field is controlled based upon the transmission torque T, the electrical loss can be diminished, in comparison with the conventional art in which the magnetic field is controlled by supplying an electric current to an additional electromagnet.

Also, in the conventional art using the additional electromagnet, the amount of the current supplied to the stator and the amount of the current supplied to the electromagnet to move the rotor are proportional to each other. Accordingly, an adjustable range of the characteristic of the rotary electrical machine is limited to a narrow range. However, according to the rotary electrical machine 7, when it works as the electric motor, the characteristic is adjustable regardless of the amount of the current supplied to the stator 14. The degree of freedom for designing can thus be improved.

Further, the rotor position changing mechanism 15 changes the distance between the rotor 13 and the stator 14 in response to the magnitude of the transmission torque T. Thus, the magnetic field established between the rotor 13 and the stator 14 is controlled to be strong or weak in response to the magnitude of the transmission torque T. Because of this control, the following effects can be obtained.

That is, in the rotary electrical machine 7, as described above, the rotor 13 can stay at the position spaced apart from the stator 14 while the transmission torque T is small, and the rotor 13 can approach the stator 14 together with the increase of the transmission torque T. Thus, when the rotary electrical machine 7 works as the electric motor, the rotor 13 recedes from the stator 14 (the dotted lines of FIG. 1) while the output torque from the rotor 13 to the rotational shaft 12 is small, and the magnetic field is weak. Accordingly, under the low torque condition where the output torque is low, the rotational shaft 12 can rotate at a high speed. For example, by applying the rotary electrical machine 7 to the electric vehicle 1, the running speed of the vehicle 1 under the condition that the output torque is small, e.g., under the low torque condition, can be increased.

On the other hand, when the transmission torque T to the rotational shaft 12 from the rotor 13 becomes large, the rotor 13 approaches the stator 14 (the actual line of FIG. 1), and the magnetic field increases. Thus, the output torque of the rotational shaft 12 under a low speed rotational condition can be a high torque. For example, by applying the rotary electrical machine 7 to the electric vehicle 1, the output torque in a starting operation or in an accelerating operation of the electric vehicle 1 can be the high torque. The starting or accelerating operations can thus be made quickly.

As thus discussed, when the rotary electrical machine 7 works as the electric motor, a suitable characteristic can be obtained in which the high torque is given in the low speed operation, while the low torque is given in the high speed operation. Accordingly, the rotary electrical machine 7 can work in such a wide span ranging between the low speed high torque area to the high speed-low torque area.

On the other hand, when the rotary electrical machine 7 works as the generator, the rotary electrical machine 7 can make the regenerating braking. In this regenerating braking state, the reverse force component can be generated from the transmission torque T which is the input torque to the rotational shaft 12, and the rotor 13 moves in the going direction A using the reverse force component as its driving force. On this occasion, if the reverse force component becomes large, the rotor 13 recedes from the stator 14 and the magnetic field weakens. Thus, an over-braking or an overcharging can be inhibited.

As described above, the rotor position changing mechanism 15 includes the force component generating mechanism 27 generating the force component from the transmission torque T to move the rotor 13. Accordingly, the force component generating mechanism 27 directly provides the force component to the rotor 13 in response to the magnitude of the transmission torque T. Thus, differently from the art in which the external force for moving the rotor indirectly affects the rotor, for example, the conventional art in which an electromagnet is provided to attract the rotational shaft, the mechanical or electrical generation of a large loss in moving the rotor 13 is inhibited.

Also, the rotor position changing mechanism 15 has the spring 26 urging the rotor 13 in the moving direction of the rotor 13. Thus, by adjusting the characteristic of the spring 26, the degree of the approaching state or the receding state between the rotor 13 and the stator 14 can be freely set. Accordingly, a complicated device is not necessary for adjusting the degree of the approaching state or the receding state of the rotor 13. Because the spring 26 has a simple structure, the structure of the rotary electrical machine 7 can be made simpler.

Alternatively, as indicated by a dotted line in FIG. 1, another spring 26' urging the rotor 13 to the returning direction B can be provided in addition to the spring 26 in FIG. 1 that urges the rotor to the going direction A. That is, two springs 26, 26' can be provided with urging directions opposite each other. Each urging force of the spring 26 and the spring 26' can be properly set. For example, the urging force of the spring 26 can be set larger than the urging force of the spring 26'. Therefore, the resultant force made up of the urging force of both the springs 26, 26' acts on the rotor 13 in the going direction A, and the resultant force may be smaller than the attractive magnetic force F.

If both of the springs 26, 26' are provided as described above, the phrase "urging force C of the spring 26" in the above description can read as "resultant force made up with the urging force C of the spring 26 and the urging force of the other spring 26'," and the phrase "spring constant of the spring 26" can read as "spring constants of the respective springs 26, 26'."

In this alternative construction, although the torque of the rotational shaft 12 is either the output torque or the input torque, the respective desired magnetic field controls can be realized by the springs 26, 26', and the applicable scope of the rotary electrical machine 7 can be expanded.

Also, in the rotary electrical machine 7, the spring 26 is a spring having a non-linear characteristic. Thus, by selecting the spring 26 that has a predetermined non-linear characteristic, the approaching position or receding position of the rotor 13 relative to the stator 14 can be decided at will in response to the magnitude of the transmission torque T, and a desired torque characteristic can be obtained. For example, the attractive magnetic force F generated between the rotor 13 and the stator 14 intrinsically has a non-linear characteristic relative to the distance between the rotor 13 and the stator 14. However, the non-linearity of the urging force C of the spring 26 can make the characteristic of the resultant force made up of the urging force C and the attractive magnetic force F a subtle force that acts on the rotor 13 to incrementally move the rotor 13.

Further, in the rotary electrical machine 7, the spring 26 has the multiple spring members 32 with free lengths that differ from each other. Thus, the spring 26 can have any desired characteristics such as, for example, a non-linear characteristic in all, by, for example, using some springs having a linear characteristic as a part of the multiple spring members 32, and some other springs having a non-linear characteristic as the remainder part thereof. Thereby, because the structure of each spring member 32 having the linear characteristic is simple enough, the structure of the rotary electrical machine 7 can be simplified to the extent that it uses the simple spring members 32.

The force component generating mechanism 27 has a helical structure that moves the rotational shaft 12 and the rotor 13 relative to each other about the axis 3 generally along a helical path. Thus, via such a mechanically simple structure, e.g., the generally helical structure, the force component can be generated from the transmission torque T between the rotational shaft 12 and the rotor 13, and the force component can be directly transmitted to the rotor 13. Accordingly, the structure of the rotary electrical machine 7 can be simpler, and the mechanical or electrical generation of a large loss in moving the rotor 13 is inhibited.

Particularly, in this embodiment, the force component generating mechanism 27 is formed with the helical gear unit 34 positioned between the rotational shaft 12 and the rotor 13. The helical gear unit 34 is compact and has a simple structure. Accordingly, the size of the rotary electrical machine 7 can be decreased and the structure thereof can be simplified.

The rotary electrical machine 7 in this embodiment is the so-called flat type rotary electrical machine with a rotor 13 generally having a disk shape, and the rotor 13 and the stator 14 face each other in the axial direction of the rotational shaft 12. Thus, when the rotor 13 moves in the axial direction of the rotational shaft 12, the gap size E of the gap separating the rotor 13 and the stator 14 varies.

On the other hand, as shown in the fourth embodiment (see FIG. 4) described below, another rotary electrical machine is known. This machine is a type in which the rotor 13 and the stator 14 face each other along a radial direction from the axis. In this type of rotary electrical machine, when the rotor 13 moves in the axial direction thereof, the gap size between the rotor 13 and the stator 14 does not vary; however, facing areas of the rotor 13 and the stator 14 vary. In comparison with this variable facing area type rotary electrical machine, a change ratio of the torque characteristic of the rotary electrical machine 7 per unit moving distance of the rotor 13 is larger, because the gap size E varies as discussed above. Thus, a moving distance of the rotor 13 can be shorter than that of the variable facing area type rotary electrical machine. Accordingly, the rotary electrical machine 7 can be compact. For example, by applying the rotary electrical machine 7 to the electric vehicle 1, the reduction in size of the electric vehicle 1 can be improved.

Additionally, various alternatives of the embodiment described above can be provided (as well as for the other embodiments described below). For example, the characteristic of the spring 26 can be a linear one. The respective spring members 32 of this spring 26 can have the same shape as one another, have the same size as one another, or have the same characteristic as one another. Also, the force component generating mechanism 27 can have helical or generally helical structures other than the helical gear unit 34 such as, for example, but without limitation, screws, ball screw mechanisms in which a plurality of balls are used, etc. Further, the teeth 23 and the coils 24 can be placed on the rotor 13 side, while the permanent magnets 18 can be placed on the stator 14 side.

Next, second, third, fourth and fifth embodiments will be described. The respective embodiments have a number of points being common with those of the first embodiment regarding the structure, actions and effects. Thus, the same reference numerals will be assigned to those which are common in the figures and will not be described repeatedly, and different points will be mainly described. Additionally, the structures of the respective portions in those embodiments can be combined in various ways in light of the objects and actions/effects of the present invention.

In the second embodiment, the setting of the spring 26 of the first embodiment is changed so that the urging force C of the spring 26 is smaller that the attractive magnetic force F.

In this embodiment, when the rotary electrical machine 7 works as the electric motor, the attractive magnetic force F moves the rotor 13 to the returning direction B until the rotor 13 abuts the second stopper 29 regardless of the magnitude of the transmission torque T. As a result, the rotor 13 can be always placed at a position close to the stator 14 (see the actual lines in FIG. 1).

When the rotary electrical machine 7 operates as the generator, the reverse force component is generated by the transmission torque T transmitted to the rotor 13 from the rotational shaft 12, and the reverse force component acts on the rotor 13 in the going direction A. On this occasion, if the input torque to the rotational shaft 12 is small, the reverse force component is small. If the resultant force made up with this reverse force component and the urging force C of the spring 26 is smaller than the attractive magnetic force F, the position of the rotor 13 is kept at the position close to the stator 14 (see the actual lines in FIG. 1). Thus, the gap size E is maintained small, and the magnetic field is strong.

On the other hand, if the input torque to the rotational shaft 12 is large, the reverse force component is large, because the transmission torque T transmitted to the rotor 13 from the rotational shaft 12 is large. If the resultant force made up with this reverse force component and the urging force C of the spring 26 is sufficiently larger than the attractive magnetic force F, the resultant force moves the rotor 13 in the going direction A until the rotor 13 abuts on the first stopper 28, and the rotor 13 is placed at a position spaced apart from the stator 14 (see the one dot chain lines of FIG. 1). Thus, the gap size E is large, and the magnetic field is weak.

In this regard, if the structure of the force component generating mechanism 27 that generates the reverse force component is properly constructed, the reverse force component, the urging force C of the spring 26 and the attractive magnetic force F can be balanced with each other. For example, by properly setting a helix angle of the helical gear unit 34 and a spring constant of the spring 26 to respective desired values, the reverse force component, the urging force C and the attractive magnetic force F can balance with each other. By balancing of the reverse force component, the urging force C and the attractive magnetic force F, the rotor 13 can be placed at a desired position between the first stopper 28 and the second stopper 29. The rotor 13 thus can rotate at the desired position. Accordingly, the characteristics of the rotary electrical machine 7 can be freely set. That is, for example, a setting can be made in which the generating voltage of the rotary electrical machine 7 is generally fixed regardless of the rotational speed of the rotational shaft 12, or other similar free settings.

Thus, when the rotary electrical machine 7 works as the generator, if, for example, the generated voltage is charged into a secondary battery, generating circuits such as, for example, a voltage rising circuit or a voltage lowering circuit can be simplified. Also, the characteristic of the rotary electrical machine 7 can be set to be a desired characteristic that is suitable for charging the voltage into the secondary battery.

Figure 3:
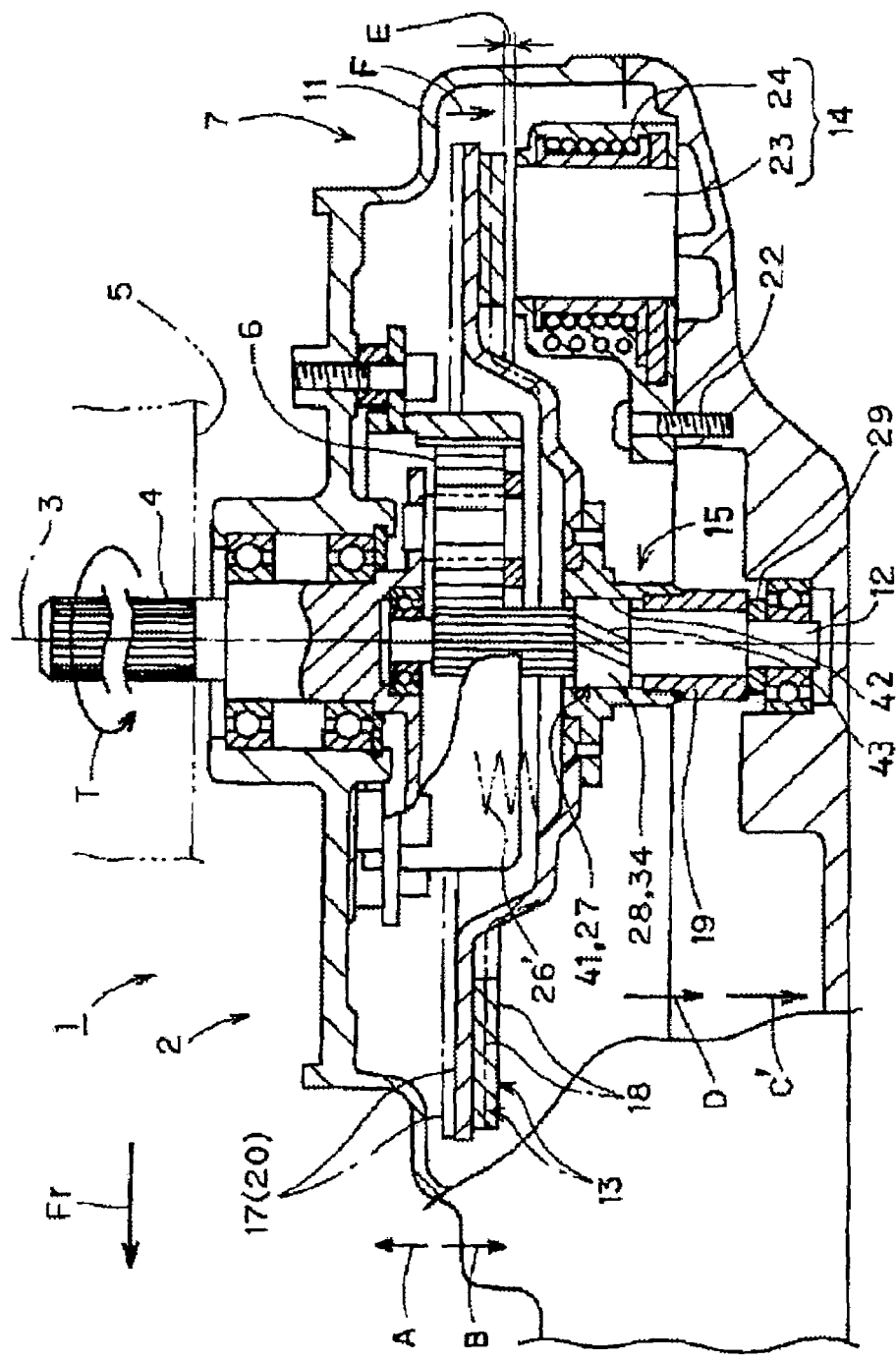
FIG. 3 is a cross sectional plan view of a rotary electrical machine according to a third embodiment.

With reference to FIG. 3, the third embodiment will be described. In this embodiment, the spring 26 urging the rotor 13 to the going direction A is removed in the variation of the first embodiment, which has the springs 26, 26', to leave only the spring 26' that urges the rotor 13 to the returning direction B.

According to this embodiment, when the rotary electrical machine 7 operates as the electric motor, the rotor 13 receives the urging force C' of the spring 26' and the attractive magnetic force F. The rotor 13 moves to the returning direction B until it abuts the second stopper 29 regardless of the magnitude of the transmission torque T. As a result, the rotor 13 is placed at a position close to the stator 14 (see the actual lines in FIG. 3).

On the other hand, when the rotary electrical machine 7 operates as the generator, the reverse force component is generated to act on the rotor 13 in the going direction A from the transmission torque (this transmission torque is equal to the input torque of the rotational shaft 12) T transmitted to the rotor 13 from the rotational shaft 12. If the input torque T of the rotational shaft 12 is small, the reverse force component is smaller than the resultant force made up of the urging force C' of the spring 26' and the attractive magnetic force F. On this occasion, the rotor 13 moves to the returning direction B to be placed at the position close to the stator 14 (see the actual lines of FIG. 7). As a result, the gap size E is small, and the magnetic field between the rotor 13 and the stator 14 is strong.

In contrast, if the input torque T of the rotational shaft 12 is large, the reverse force component is larger than the resultant force made up with the urging force C' of the spring 26' and the attractive magnetic force F, and the rotor 13 moves in the going direction A until the rotor 13 abuts on the first stopper 28. As a result, the rotor 13 is placed at a position spaced apart from the stator 14 (see the one dot chain lines in FIG. 7). Thus, the gap size E is large, and the magnetic field is weak.

In this connection, the helix angle of the helical gear unit 34 that generates the reverse force component, the spring constant of the spring 26' and other parameters are set to be desired values. The reverse force component, the urging force C of the spring 26' and the attractive magnetic force F can balance with each other. By balancing the respective forces, the rotor 13 can be placed at a desired position between the first stopper 28 and the second stopper 29. That is, the characteristic of the rotary electrical machine 7 can be freely set. For example, a setting can be made in which the generating voltage of the rotary electrical machine 7 is generally fixed regardless of the rotational speed of the rotational shaft 12, or other similar free settings. Thus, when the rotary electrical machine 7 works as the generator, if, for example, the generated voltage is charged into a secondary battery, generating circuits such as, for example, a voltage rising circuit or a voltage lowering circuit can be simplified, and the characteristic of the rotary electrical machine 7 as the generator can be a desired characteristic that is suitable for charging the voltage into the secondary battery.

Figure 4:
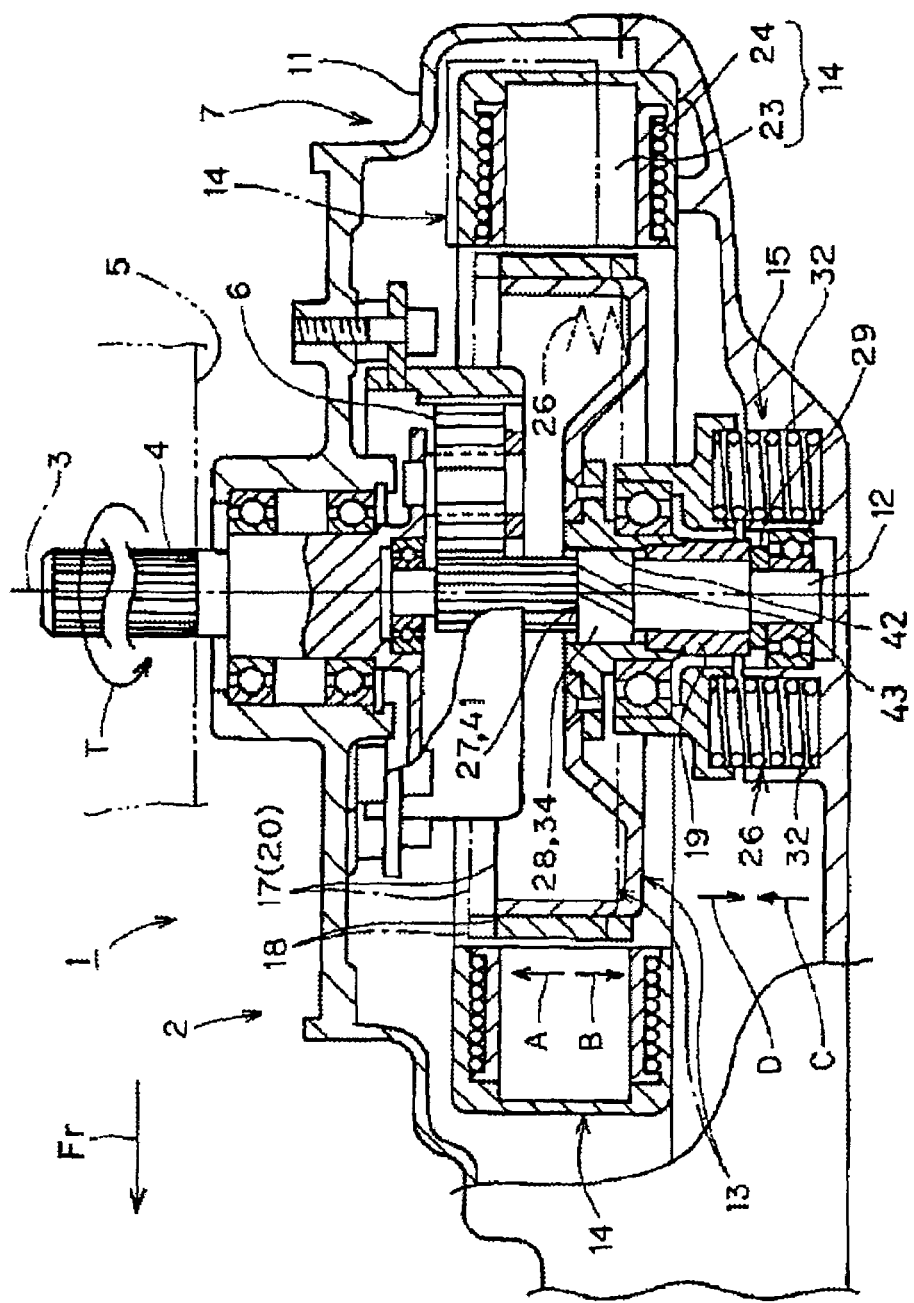
FIG. 4 is a cross sectional plan view of a rotary electrical machine according to a fourth embodiment.

With reference to FIG. 4, the fourth embodiment will be described. The fourth embodiment is a rotary electrical machine 7 having a rotor 13 whose shape is generally cylindrical.

In this embodiment, the permanent magnets 18 of the rotor 13 and the teeth 23 of the stator 14 face each other in a radial direction about the axis 3 (right to left direction in FIG. 4). In this embodiment, when the rotor 13 moves in the axial direction thereof, the rotor 13 approaches or recedes from the stator 14, and the areas of the rotor 13 and the stator 14 that face each other vary. Because of this variation in the areas that face each other, the strength of the magnetic field varies.

Obviously from the above description, the sentence "the rotor 13 approaches or recedes from the stator 14" in this specification means that the rotor 13 in all approaches or recedes from the stator 14, and should not be limited to the interpretation that the rotor moves so that the gap size between them varies as in the embodiments 1-3. Accordingly, the movement for changing the areas of the rotor and the stator that face each other is included in the meaning of "approaching" or of "receding" as used above.

When the rotary electrical machine 7 operates as the generator, the transmission torque T is transmitted to the rotational shaft 12 from the rotor 13. If the load applied to the rotational shaft 12 is small, the transmission torque T transmitted from the rotor 13 to the rotational shaft 12 is small in accordance with the load. As a result, the force component D generated by the force component generating mechanism 27 is small. If the force component D is small, the urging force C of the spring 26 is large relative to the force component D, and the rotor 13 recedes from the stator 14 (see the one dot chain lines of FIG. 4) to reduce the size of the areas that face each other. Accordingly, the magnetic field between the rotor 13 and the stator 14 is weakened.

On the other hand, if the load applied to the rotational shaft 12 is large, the transmission torque T is also large together with the load. As a result, the force component D is large. If the force component is large, the rotor 13 approaches the stator 14 against the urging force C (see the actual lines in FIG. 4), and the size of the areas that face each other increase. Accordingly, the magnetic field becomes stronger.

As thus constructed, also in this embodiment, the suitable torque characteristic, e.g., the characteristic that brings the high torque while the speed is low and also the low torque while the speed is high, can be obtained by the compact and simple structure.

Figure 5:
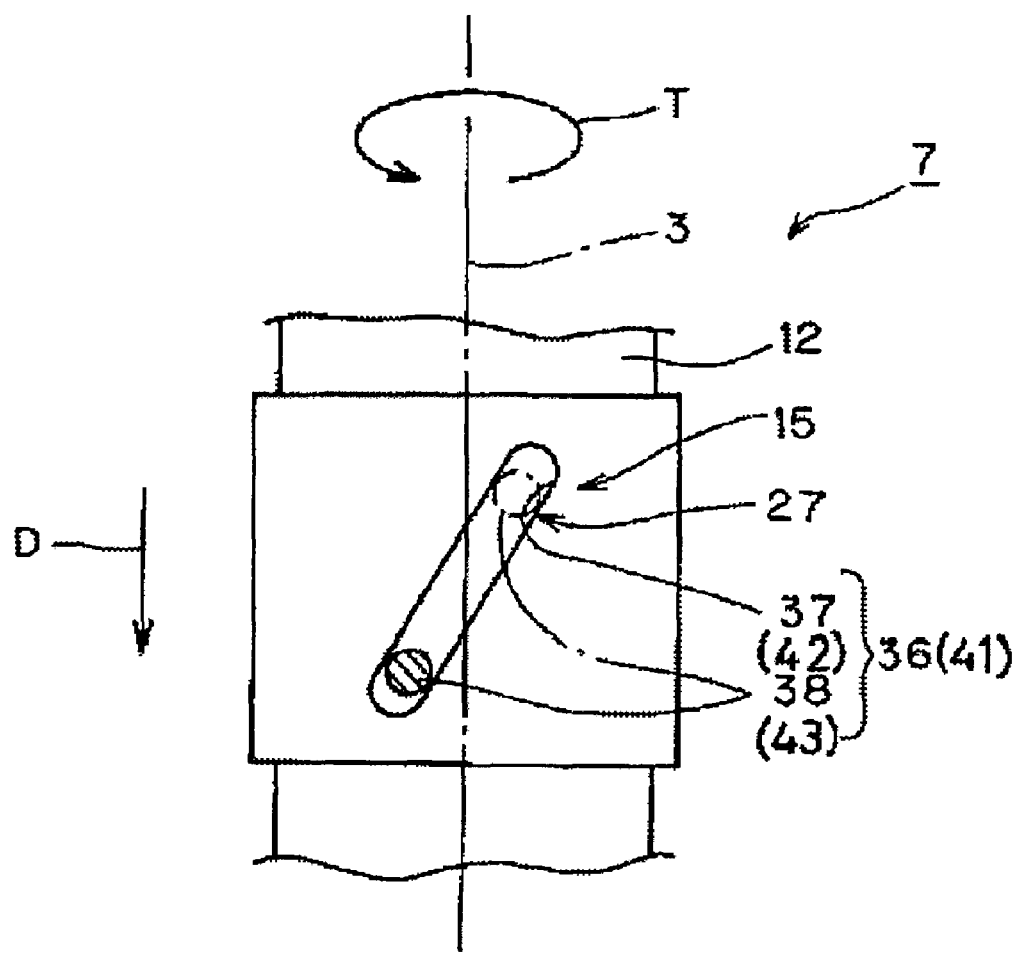
FIG. 5 is a cross sectional plan view, showing a first specific example of a moving member according to a fifth embodiment.
Figure 6:
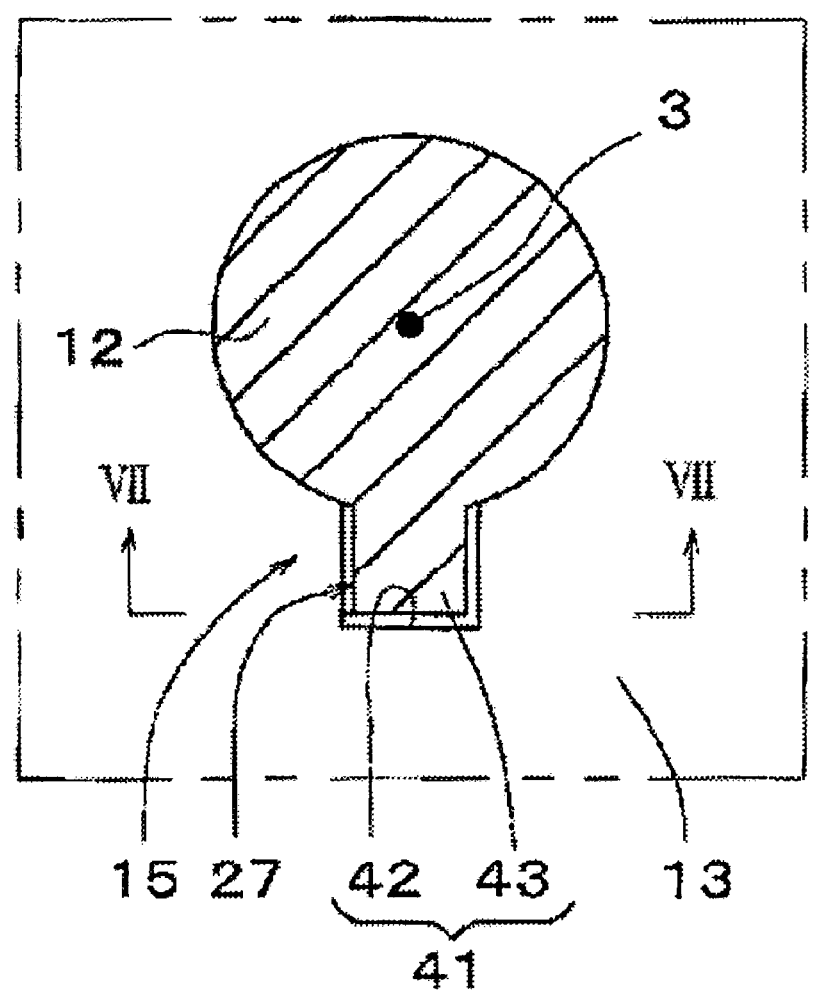
FIG. 6 is a cross sectional plan view, showing a second specific example of the moving member according to the fifth embodiment.
Figure 7:
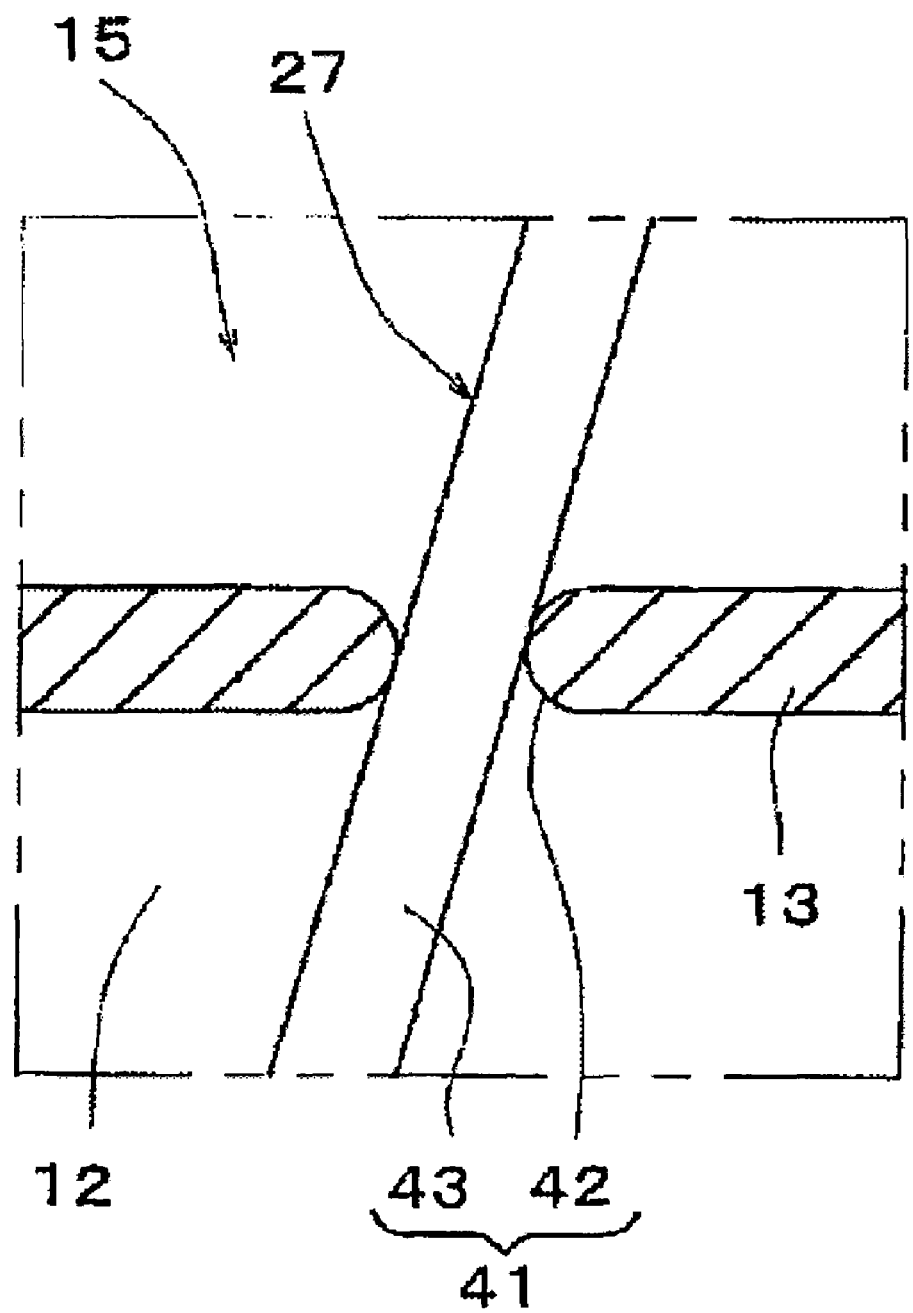
FIG. 7 is a cross sectional view, taken along the line VII-VII of FIG. 6.

With reference to FIGS. 5-7, the fifth embodiment will be described. The fifth embodiment is similar to the first embodiment except that the force component generating mechanism 27 is modified.

The rotor position changing mechanism 15 in the first embodiment generates the force component from the torque or power transmitted in the interior of the rotary electrical machine 7 using the force component generating mechanism 27, and moves the rotor 13 by the force component. The rotor position changing mechanism 15 can be called a "moving member" since it has the function of moving the rotor 13.

That is, the rotary electrical machine 7 has a moving member 41 that can transmit torque or power between the rotational shaft 12 and the rotor 13, can make the rotational shaft 12 and the rotor 13 rotate relative to each other about the axis 3, and can move the rotor 13 relative to the rotational shaft 12 in the axial direction by the relative rotation of the rotational shaft 12 and the rotor 13. In the first embodiment, the moving member 41 is formed with the helical gear unit 34. However, the moving member 41 is not limited to the helical structure such as, for example, the helical gear unit 34 or the like.

According to the moving member 41 thus constructed, via a simple movement in which the rotational shaft 12 and the rotor 13 simply helically rotate relative to each other, the gap size E between the rotor 13 and the stator 14 can be changed, or the size of the areas of the rotor 13 and the stator 14 that face each other can be changed (see the fourth embodiment). The characteristic of the rotary electrical machine 7 can thus be changed using the moving member 41 via the simple structure.

The moving member 41 is formed with an engaging structure in which the rotational shaft 12 and the rotor 13 engage with each other, and engaging portions thereof helically extend about the axis 3 of the rotational shaft 12. When the force component of the transmission torque T is generated between the rotational shaft 12 and the rotor 13, the force component is given to either one of the rotational shaft 12 and the rotor 13 from the other one through the engaging portions. Because the engaging portions helically extend about the axis 3, the rotor 13 receiving the force component moves along a longitudinal direction of the engaging portions. That is, the rotor 13 helically moves relative to the rotational shaft 12.

As other specific examples of the moving member 41, a first specific example (see FIG. 4) and a second specific example (see FIGS. 5 and 6) will be described below.

FIG. 5 shows the first specific example of the moving member 41.

In this specific example, the moving member 41 is formed with a cam unit 36 having a helical structure. This cam unit 36 is positioned between the rotational shaft 12 and the rotor 13, and helically moves the rotational shaft 12 and the rotor 13 relative to each other about the axis 3 using a portion of the transmission torque T as the driving force. The cam unit 36 includes a helically shaped cam hole 37 formed on either one of the rotational shaft 12 and the rotor 13, and a cam projection 38 formed on the other one. The cam projection 38 is fitted into the cam hole 37 to movably engage the cam hole 37. In the illustrated embodiment, the cam projection 38 extends from the rotational shaft 12, while the cam hole 37 is formed on the rotor 13.

The cam unit 36 is preferably a compact and simple mechanism. Thus, according to this structure, the moving member 41 can be realized with a compact and simple structure. Accordingly, the rotary electrical machine 7 can be a compact and simple structure.

As thus discussed, the so-called concave and convex engaging structure can be suitably used as the engaging structure of the moving member 41. That is, the moving member 41 can include a concave engaging structure 42 formed on either one of the rotational shaft 12 and the rotor 13 and helically extending therefrom, and a convex 43 formed on the other one and engaging with the concave 42. In the embodiments described above, helical tooth bottom ends of the helical gear unit 34 or the helically shaped cam hole 37 of the cam unit 36 correspond to the concave engaging structure 42, while helical tooth top ends of the helical gear unit 34 or the cam projection 38 of the cam unit 36 correspond to the convex engaging structure 43. However, specific constructions of the concave and convex engaging structures 42, 43 are not limited to those of the embodiments. For example, a helically shaped slot penetrating the rotational shaft 12 can be the concave engaging structure 42, while a pin having distal ends supported by the rotor 13 and being fitted into the slot can be the convex engaging structure 43.

The rotary electrical machine with the construction described above, unlike the rotary electrical machine of Japanese Publication No. JP 11-122886, does not require a centrifugal governor which external size is large and structure is complicated. Accordingly, the external dimensions of the rotary electrical machine can be decreased. Additionally, the structure of the rotary electrical machine can be simplified. By applying this rotary electrical machine to an electric vehicle, the downsizing and the simplification of the structure can be achieved for the electric vehicle.

Also, the rotary electrical machine can be constructed, unlike the rotary electrical machine of Japanese Publication No. JP 03-215154, to eliminate an electromagnet which attracts the rotational shaft in the axial direction. Thus, the external dimensions of the machine can be reduced and the structure of the machine simplified. Also, because the stator and the electromagnet of the rotary electrical machine disclosed in Japanese Publication No. JP 03-215154 are connected to each other in series, the amount of the current supplied to the stator and the amount of the current supplied to the electromagnet are in proportion to each other. This limits an adjustable range of the torque characteristic of the rotary electrical machine to a narrow range. In contrast, the torque characteristic of the rotary electrical machine described above is adjustable regardless of the amount of the current supplied to the stator. The degree of freedom for designing can therefore be improved.

A force component can therefore be generated from the transmission torque, and the rotor can move in the axial direction of the rotational shaft in response to the force component. Accordingly, the magnetic field can be controlled by the force component of the transmission torque. Thus, unlike the rotary electrical machine of JP 03-215154, which uses the electromagnet for moving the rotor, an electrical loss can be diminished. Also, in the rotary electrical machine of JP 03-215154, the external force for moving the rotor affects the rotational shaft. That is, the external force for moving the rotor indirectly affects the rotor through the rotational shaft. In contrast, the force component directly affects the rotor in the present rotary electrical machine described above. Thus, in moving the rotor, the mechanical or electrical generation of a large loss is inhibited.

FIGS. 6 and 7 show the second specific example of the moving member 41. In the second specific example, the outer circumferential surface of the rotational shaft 12 has the convex engaging structure 43 helically extending about the axis 3, while the inner circumferential surface of the rotor 13 has the concave engaging structure 42 engaging with the convex engaging structure 43. The moving member 41 is thus formed with the concave and convex engaging structures 42, 43. Additionally, in the second specific example, the concave engaging structure 42 does not extend helically, and the concave and convex engaging structures 42, 43 engage with other in such a manner that two points of the inner surface of the concave engaging structure. 42 straddle and contact opposite sides of a longitudinal portion of the convex engaging structure 43 disposed therebetween. When the rotational shaft 12 and the rotor 13 rotate relative to each other about the axis 3, an outer surface of the convex engaging structure 43 engages with either one of the two points of the inner surface of the concave engaging structure 42 so that the rotor 13 moves in the longitudinal direction of the convex engaging structure 43. Because the convex engaging structure 43 extends helically, the rotor 13 moves helically relative to the rotational shaft 12.

According to the first and second specific examples described above, because of the engagement of the concave and convex engaging structures 42, 43 with each other following the relative movement of the rotational shaft 12 and the rotor 13, the gap size E between the rotor 13 and the stator 14 can vary, or the size of the areas thereof that face each other can be varied. Thus, the characteristic of the rotary electrical machine 7 can vary because of the engagement of the concave and convex engaging structures 42, 43 with each other. In this regard, the engaging structure formed of the concave and convex engaging structures 42, 43 is a relatively simple structure. Thus, via this simple structure, the characteristic of the rotary electrical machine 7 can be changed.

As described above, by configuring either one or both of the concave and convex engaging structures 42, 43 to engage with each other in a helical manner, the transmission of the torque between the rotational shaft 12 and the rotor 13 and the relative helical rotation thereof can be simultaneously realized. The rotor 13 can thus move smoothly in the axial direction relative to the rotational shaft 12.

Additionally, if both of the concave and convex engaging structures 42, 43 of the moving member 41 are helically shaped, as the helical gear unit 34, larger torque can be transmitted in comparison with the structure in which only one of them is helically shaped. Accordingly, movement of the rotor 13 in the axial direction can be made smoother and more precise.

As described above, the strength of the magnetic field between the rotor 13 and the stator 14 greatly depends on the size of the gap E between the rotor 13 and the stator 14. Thus, according to the rotary electrical machine 7 described above, the strength of the magnetic field can change on a large scale even though the movement amount of the rotor 13 in the axial direction is small. Conversely, the movement amount of the rotor 13 in the axial direction needed to obtain a desired torque characteristic can be small. This can advantageously reduce the space needed for the axial movement of the rotor 13. The size of the rotary electrical machine 7 can thus be advantageously reduced. Similarly, an electric vehicle 1 incorporating such a rotary electrical machine 7 can likewise be downsized.

As thus described above, the present invention is useful with a rotary electrical machine and an electric vehicle having the rotary electrical machine.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A rotary electrical machine comprising:
a base member;
a stator fixed to the base member;
a rotational shaft supported by the base member for rotation about an axis;
a rotor coupled with the rotational shaft and disposed so as to face the stator, the rotor and rotational shaft configured to move relative to each other about the axis; and
a rotor position changing mechanism transmitting torque between the rotor and the rotational shaft and configured to urge the rotor toward the stator along an axial direction of the rotational shaft, as torque transmitted from the rotor to the rotational shaft increases, the rotor position changing mechanism comprising a spring having one end attached to the base member and an opposite end operatively coupled to the rotor via a bearing.

2. The rotary electrical machine according to claim 1, wherein the rotor position changing mechanism is further configured to urge the rotor away from the stator along the axial direction of the rotational shaft as torque transmitted from the rotational shaft to the rotor increases.

3. The rotary electrical machine according to claim 1, wherein the rotor position changing mechanism comprises a force component generating mechanism configured to generate a force component that shifts the rotor in the axial direction of the rotational shaft in accordance with the torque transmitted between the rotational shaft and the rotor.

4. The rotary electrical machine according to claim 3, wherein the force component generating mechanism has a helical structure via which the rotational shaft and the rotor are configured to move helically relative to each other about the axis of the rotational shaft.

5. The rotary electrical machine according to claim 3, wherein the force component generating mechanism comprises an engaging structure via which the rotational shaft and the rotor engage each other, at least a portion of the engaging structure extending helically about the axis of the rotational shaft.

6. The rotary electrical machine according to claim 3, wherein the force component generating mechanism comprises a helical gear unit disposed between the rotational shaft and the rotor.

7. The rotary electrical machine according to claim 3, wherein the force component generating mechanism comprises a cam unit disposed between the rotational shaft and the rotor.

8. The rotary electrical machine according to claim 1, wherein the rotor position changing mechanism comprises a spring configured to urge the rotor in a direction in which the rotor moves toward the stator.

9. The rotary electrical machine according to claim 8, wherein the spring comprises a first spring member configured to urge the rotor in the direction in which the rotor moves toward the stator, and a second spring member configured to urge the rotor in the direction in which the rotor moves away from the stator.

10. The rotary electrical machine according to claim 8, wherein the spring has a non-linear characteristic.

11. The rotary electrical machine according to claim 8, wherein the spring comprises a plurality of spring members, each member having a different characteristic, and the respective spring members being coupled with each other.

12. The rotary electrical machine according to claim 1, wherein the rotor position changing mechanism comprises a spring configured to urge the rotor in a direction in which the rotor moves away from the stator.

13. The rotary electrical machine according to claim 12, wherein the spring comprises a first spring member configured to urge the rotor in the direction in which the rotor moves toward the stator, and a second spring member configured to urge the rotor in the direction in which the rotor moves away from the stator.

14. The rotary electrical machine according to claim 12, wherein the spring has a non-linear characteristic.

15. The rotary electrical machine according to claim 12, wherein the spring comprises a plurality of spring members, each member having a different characteristic, and the respective spring members being coupled with each other.

16. The rotary electrical machine according to claim 1, wherein a size of a gap separating the rotor and the stator from each other varies in accordance with the movement of the rotor relative to the stator.

17. The rotary electrical machine according to claim 1, wherein the rotor and the stator face each other in a direction parallel to the axial direction of the rotational shaft.

18. An electric vehicle comprising the rotary electrical machine according to claim 1 as a driving force source for operating the vehicle.

19. The rotary electrical machine of claim 1, wherein the rotor transmits torque to the rotor position changing mechanism via a helical gear to effectuate the relative rotation of the rotor and the shaft about the axis, and to effectuate the axial movement of the rotor along the axial direction of the shaft.

20. The rotary electrical machine of claim 19, wherein the axial movement of the rotor is transmitted to the rotational shaft via a spline connection.

21. A rotary electrical machine comprising:
a base member;
a stator fixed to the base member;
a rotational shaft supported by the base member for rotation about an axis;
a rotor coupled with the rotational shaft and disposed so as to face the stator, the rotor and rotational shaft configured to move relative to each other about the axis; and
a rotor position changing mechanism transmitting a torque between the rotor and the rotational shaft and being configured to urge the rotor away from the stator along an axial direction of the rotational shaft as torque transmitted from the rotor to the rotational shaft decreases, the rotor position changing mechanism comprising a spring having one end supported by the base member and an opposite end operatively coupled to the rotor via a bearing.

22. The rotary electrical machine of claim 21, wherein the rotor position changing mechanism is further configured to urge the rotor away from the stator along the axial direction of the rotational shaft, if transmission torque transmitted from the rotational shaft to the rotor increases, when the rotary electrical machine operates as a generator.

23. The rotary electrical machine of claim 21, wherein the rotor transmits torque to the rotor position changing mechanism via a helical gear to effectuate the relative rotation of the rotor and the shaft about the axis, and to effectuate the axial movement of the rotor along the axial direction of the shaft.

24. The rotary electrical machine of claim 23, wherein the axial movement of the rotor is transmitted to the rotational shaft via a spline connection.

25. A rotary electrical machine comprising:
a base member;
a stator fixed to the base member;
a rotational shaft supported by the base member for rotation about an axis;
a rotor coupled with the rotational shaft and disposed so as to face the stator; and
a rotor position changing mechanism coaxial with the rotor and the rotational shaft, the rotor position changing mechanism configured to transmit torque between the rotor and the shaft and to urge the rotor toward the stator along an axial direction of the rotational shaft as the torque transmitted from the rotor around the rotational shaft increases, the rotor position changing mechanism comprising a spring having one end supported by the base member and an opposite end operatively coupled to the rotor via a bearing, the spring configured to urge the rotor in a direction away from the stator.

26. A rotary electrical machine comprising:
a base member;
a stator fixed to the base member;
a rotational shaft supported by the base member for rotation about an axis;
a rotor coupled with the rotational shaft and disposed so as to face the stator; and
a rotor position changing mechanism coaxial with the rotor and the rotational shaft, the rotor position changing mechanism configured to transmit torque between the rotor and the shaft and to urge the rotor away from the stator along an axial direction of the rotational shaft as torque transmitted from the rotor around the rotational shaft decreases, the rotor position changing mechanism comprising a spring having one end attached to the base member and an opposite end operatively coupled to the rotor via a bearing, the spring configured to urge the rotor in a direction away from the stator.

* * * * *

UNITED STATES PATENT AND TRADEMARK OFFICE
CERTIFICATE OF CORRECTION

PATENT NO. : 7,342,342 B2
APPLICATION NO. : 11/335868
DATED : March 11, 2008
INVENTOR(S) : Shinya Naitou et al.

It is certified that error appears in the above-identified patent and that said Letters Patent is hereby corrected as shown below:

At column 12, line 21, please delete "26.'" and insert -- 26'. --, therefor.

At column 19, line 18, please delete "13in" and insert -- 13 in --, therefor.

Signed and Sealed this

Second Day of September, 2008

JON W. DUDAS
*Director of the United States Patent and Trademark Office*